United States Patent [19]

Mühle

[11] 4,115,066
[45] Sep. 19, 1978

[54] HIGH PRESSURE MIXING HEAD

[75] Inventor: Dietrich Mühle, Kressbronn, Fed. Rep. of Germany

[73] Assignee: The Upjohn Company, Kalamazoo, Mich.

[21] Appl. No.: 742,906

[22] Filed: Nov. 18, 1976

[30] Foreign Application Priority Data

Dec. 8, 1975 [DE] Fed. Rep. of Germany ....... 2555156

[51] Int. Cl.² .......................... B01F 15/02; B01F 5/10
[52] U.S. Cl. .................................... 422/133; 239/586; 366/76
[58] Field of Search ................. 23/252 R, 285; 259/4; 239/116, 117, 414, 416, 584, 586

[56] References Cited

U.S. PATENT DOCUMENTS

| 2,885,268 | 5/1959 | Breer et al. ........................ 23/252 R |
| 3,788,337 | 1/1974 | Breer ................................... 23/252 R |
| 3,960,506 | 6/1976 | Schmitzer ....................... 23/252 R X |
| 3,964,731 | 6/1976 | Ernst ..................................... 259/4 R |

*Primary Examiner*—James H. Tayman, Jr.
*Attorney, Agent, or Firm*—St. Onge, Mayers, Steward & Reens

[57] ABSTRACT

A high pressure mixing head is disclosed for combining a plurality of reactive fluid polymeric components to form a mixture thereof for molding purposes. The mixing head incorporates an expulsion plunger operating in a mixing chamber into which the several components are admitted through individual inlet openings which are covered and uncovered by reciprocation of the plunger. The mixing head further incorporates inlet valves and valve chambers located respectively upstream of the several inlet openings and so arranged that the inlet valves prevent admission of the individual components into the mixing chamber, irrespective of the plunger position, unless a predetermined pressure of the respective components is attained. Each valve chamber is connected to component feed and return lines forming part of the respective component circulating systems so that component flow at relatively low pressure takes place at all times between mixing/molding periods of operation. The component circulating systems each incorporate bypass and return line shut-off means so that, on closing the shut-off means and thus preventing return flow of the respective components, their pressures at the mixing head are increased to the predetermined level operation of the aforesaid inlet valves.

5 Claims, 2 Drawing Figures

HIGH PRESSURE MIXING HEAD

BACKGROUND OF THE INVENTION

The invention relates to a high pressure mixing head for the production of a mixture of at least two, preferably chemically reactive, plastic components in a mixing chamber which has inlet openings for the individual components and a common outlet opening for the resulting component mixture. An expulsion piston of the same cross-section as the mixing chamber, and free of any return or reflux grooves, is arranged in the mixing chamber and is adapted for reciprocating movement from a retracted position which leaves the inlet openings to the mixing chamber uncovered, to extended position in which the face of the piston is adjacent the common outlet opening, the inlet opening into the mixing chamber being covered by the piston in this latter position.

In a previously proposed high pressure mixing head (see German Gebrauchsmuster No. 7,006,182), disadvantages are encountered in that on switching over from return flow to injection, undesirably high pressure surges occur. Furthermore, the arrangement employs individual component return ducts or grooves milled directly into the surface of the expulsion piston and these give rise to difficulties as regards satisfactory sealing off of the various plastic components peripherally of the expulsion piston since the later has only a small periphery and since it is necessary to provide a separate return duct groove for each of the plastic components involved.

The disadvantages of that arrangement are avoided in a modified form of mixing head (see German Patent Specification No. 2,145,547) by eliminating the return grooves from the surface of the expulsion plunger and incorporating return ducts in the body or casing of the mixing head. In this arrangement, a separate, auxiliary piston, mechanically connected in parallel with the expulsion piston, is used to control the opening and closing of the return ducts in the mixing head housing. Return grooves are milled in the surface of the auxiliary piston but the return flow passages in the casing of the mixing heads, with which the return grooves communicate in certain positions of the plunger, do not require incorporation of restricted inlet openings, for metering and mixing purposes, similar to those employed in the mixing chamber. As a consequence, a uniform cross-sectional area of return flow path can be provided, thus reducing pressure losses in the system. In this prior arrangement, however, the opening and closing of the inlets to the mixing chamber are accordingly controlled to operate synchronously with the opening and closing of the return ducts by the auxiliary piston. In order to make this possible, it is necessary to provide a relatively complicated design which requires very close manufacturing tolerances. Moreover, there is a particular disadvantage of the system in that the return or recycling of component flow occurs under substantially the same or only slightly reduced high pressure as is maintained during an injection operation. Thus the whole system, including the components of the mixing head, are constantly subjected to such high pressure, something which gives rise to sealing problems and again involves complication of design in order to provide for sufficient strength under the high pressures involved. A further disadvantage is that during the whole of the return, which in practice can be prolonged (for example for 1 hour), the expulsion piston is subjected to the action of the plastics components. More particularly in the case of liquids with very low viscosities the result may be that owing to unavoidable leakages reactions occur between the different plastics components, which can lead to a sticking or corrosion of the expulsion piston. Furthermore so-called calibration which has to be carried out relatively frequently, gives rise to complicated requirements. Such calibration must be carried out in order to provide for precise mutual matching of the quantities of the different plastics components. Calibration is thus carried out in the position of the expulsion piston, in which the inlet openings to the mixing chamber are uncovered, for which reason additional means have to be provided to ensure that the different plastics components cannot simultaneously enter the mixing chamber, as they would otherwise react chemically here.

SUMMARY OF THE INVENTION

Taking the above mentioned prior constructions as a basis the aim of the invention is now that of providing an improved mixing head which avoids the above mentioned disadvantages and in the case of which it is possible to ensure that the different plastics components do not recycle under the high injection pressure nor act on the expulsion piston. This aim is achieved in accordance with the invention in that, upstream from each inlet opening, an inlet valve is positioned in a valve chamber connected to the feed and return lines of the respective plastics component circulating system, and is arranged to close the inlet opening to the mixing chamber during recycling periods of operation. The arrangement, as described more fully hereinafter, permits recirculation of the several polymer components to take place at relatively low pressure compared to the injection pressure.

Recycling, which lasts a substantially longer time than the injection operation, can accordingly be carried out at a low pressure value, so that the whole recycling system only has to be designed for low pressure and no sealing problems occur. The high pressure required for injection is thus only built up and maintained for short times preceding and during the injection operation in a manner described in more detail below. Furthermore there is the advantage that owing to the inlet valves, respectively arranged in the inlet openings, it is possible to ensure that during the recycling phase the expulsion piston is not constantly subjected to the action of the plastics components. By means of the inlet valves, which are closed during the recycling phase, it is thus possible to shut off the expulsion piston completely from the plastics components, so that no problems concerned with leakage, sealing or sticking occur. A further advantage is that so-called calibration is very simple, for the various components can be separately calibrated one after the other because, by using the different inlet valves, it is possible to ensure that the different plastics components do not come into contact with each other in the mixing chamber. In the case of the mixing head in accordance with the invention it is thus readily possible to calibrate a first plastics component by opening the associated inlet valve and following this the same operation is carried out with respect to the other plastics component.

Apart from these additional advantages of the mixing head in accordance with the invention the advantages of the known mixing head are preserved, since no pressure surges occur on switching over from recycling to injection and vice versa, for the inlet valves are automatically opened on reaching the injection pressure as will be described in detail below, and undesired pressure surges can either be avoided by the expulsion piston uncovering the inlet openings more or less simultaneously or by providing a pressure limiting valve between the feed and return line. It is thus possible to prevent in any case the possibility of plastics components being supplied, if even only for a short time, to the mixing head and not being simultaneously removed, something which would lead to the above mentioned pressure surges. Finally the advantage is also preserved that no difficulties are involved in supplying substantially more than two different plastics components to the mixing chamber, something which is problematical, on the other hand, in the case of the known mixing head with return grooves in the outer periphery of the expulsion piston, since the separation and sealing off of the different plastics components must take place on the limited periphery of the expulsion piston.

In accordance with a preferred embodiment the inlet valves are spring loaded valves, which automatically open on reaching the high injection pressure and close when the low pressure is reached on return. It can be appropriate to open the inlet valves shortly before the expulsion piston uncovers the inlet openings. In this respect there is thus the advantage of a very precise metering of the quantity of plastics components by simultaneous opening of the inlet openings by the expulsion piston.

In accordance with another preferred embodiment each inlet valve is arranged in a chamber constantly connected with an associated return line and furthermore in the latter there is a shut-off or cock valve which is brought into the closed position on each injection operation. In this respect it is possible to design the flow cross-section of the chamber large enough, without any difficulty being involved, in order to avoid undesired pressure increases or any choking effect, and recycling can be carried out at a low pressure value of approximately 30 atmospheres gauge.

Further explanation of the invention is provided in the following description of an embodiment which is represented in the accompanying drawings.

FIG. 1 shows generally a flow diagram for the whole of the injection system with a mixing head designed for two different plastics components. If more than two plastics components are to be processed the flow diagram is to be amplified analogously.

Figure 1:
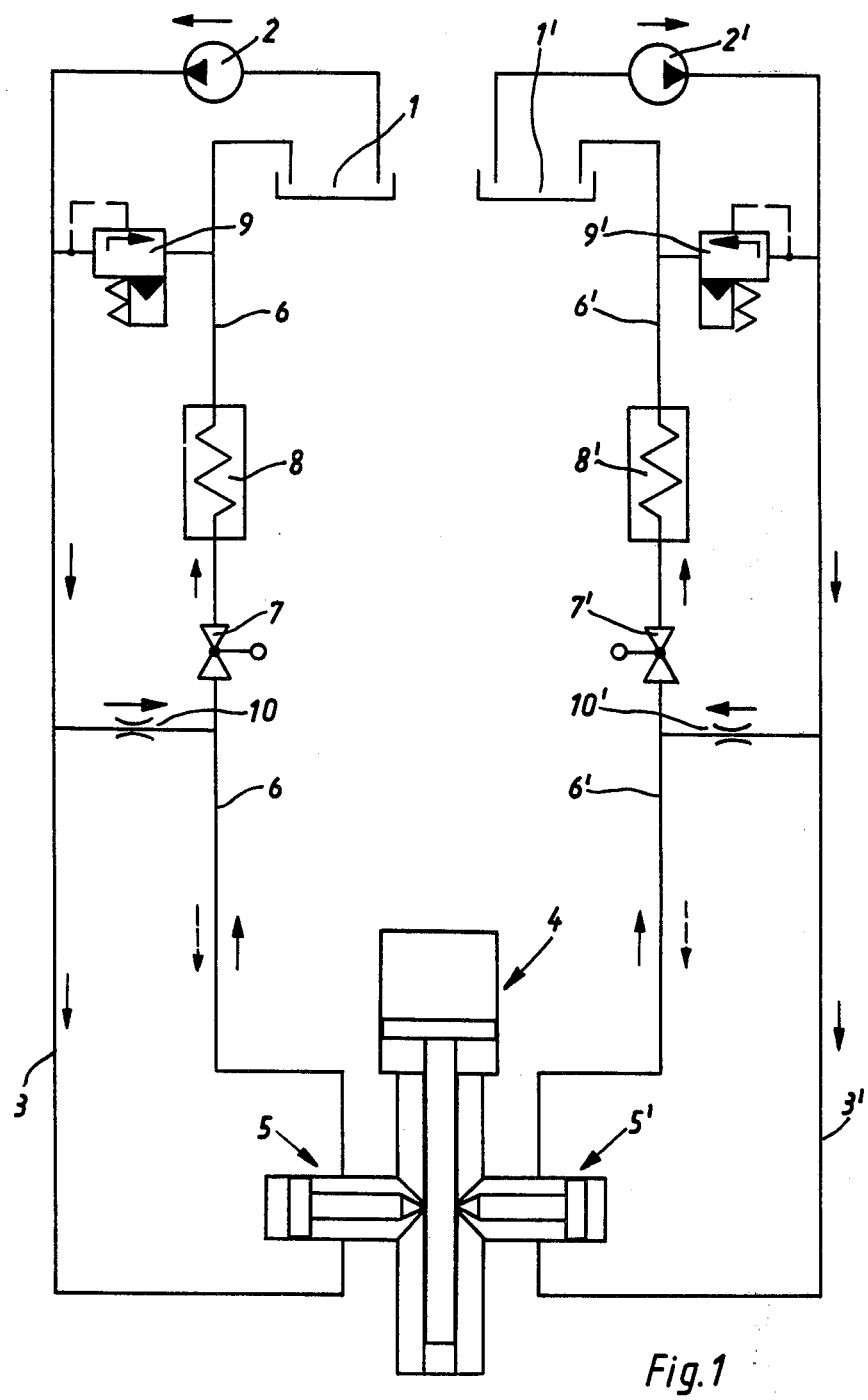
FIG. 1 is a flow diagram of the whole of the injection system incorporating the mixing head.

The flow circuit for the plastics components consists — considered in the direction of flow — of a supply container 1, a pump (for example a radial piston pump) 2, a feed line 3, a mixing head 4 with an inlet valve 5, a return flow line 6, a cock valve 7 and a cooler 8. Between the feed line 3 and the return line 6 there is a pressure limiting valve 9 which is provided at such a position that the pump forms a flow circuit with the supply container 1. Between the feed line 3 and the return line 6 there is furthermore a bypass 10 at such a position that a circuit is formed via the supply container 1, the pump 2, the bypass 10, the cock valve 7 and the cooler 8.

During the recycling phase the flow is along the path indicated by the arrows shown in solid lines and owing to a suitable selection of the flow cross-sections only a substantially minor amount of the plastics is recirculated through the inlet valve 5, the major part of the plastics component being recirculated through the bypass 10. During the injection operation started by closing of the cock valve 7 the supply of the plastics component to the inlet valve 5 occurs both through the feed line 3 and also via a part of the return line 6 in the direction of the arrow drawn with broken lines.

The above explanations apply analogously with respect to the circuiting of the other plastics component, which is represented in FIG. 1 on the right-hand side of the drawing, in the case of which like parts are denoted by like reference numerals denoted with a prime, so that description of one set serves for the other as well.

Figure 2:
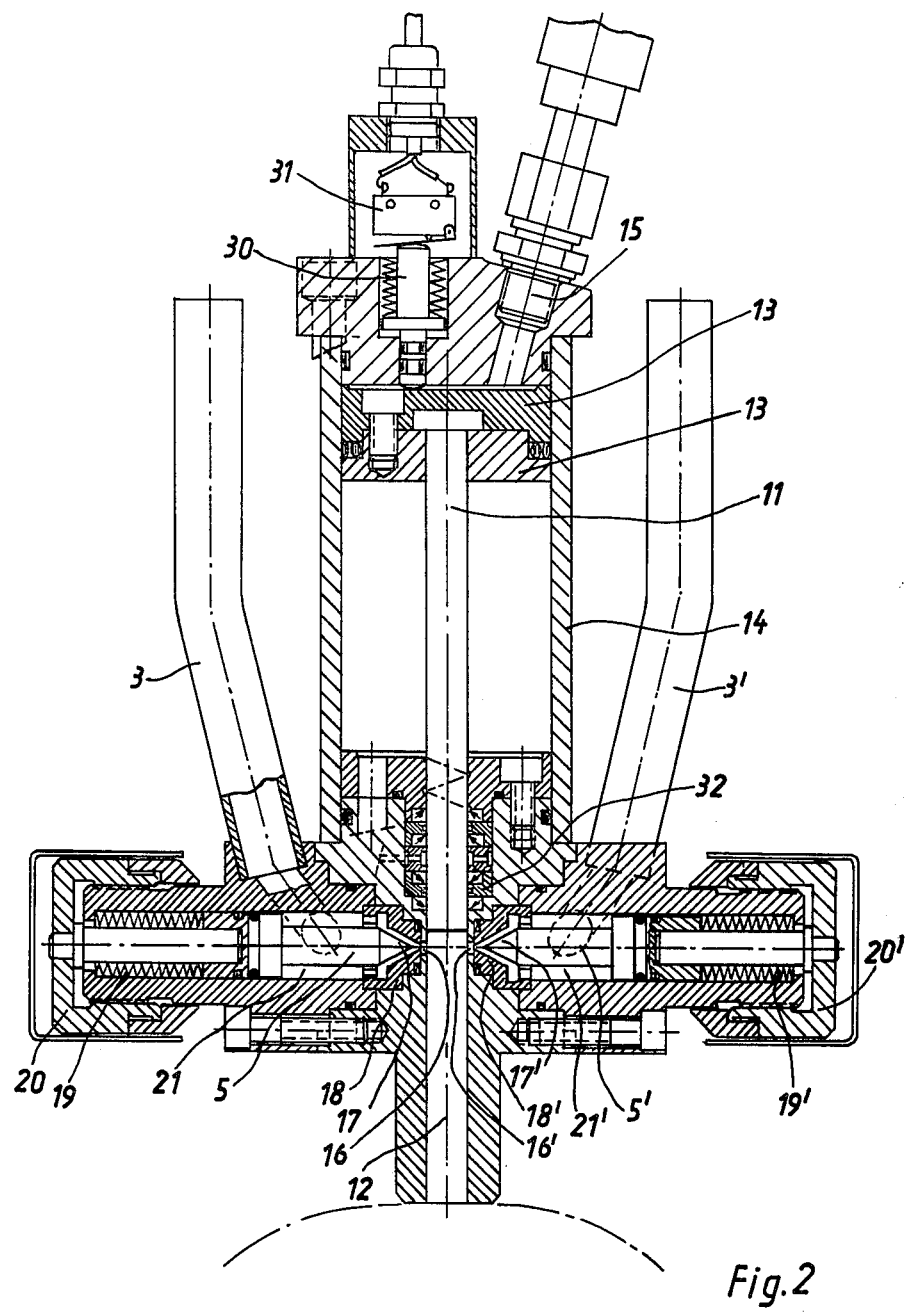
FIG. 2 is a median section through the high pressure mixing head shown only diagrammatically in FIG. 1.

With respect to the high pressure mixing head itself represented in full detail in FIG. 2 in what follows only the parts which are important for function are described.

The mixing head 4 has a central expulsion piston 11, which is lapped into a cylindrical mixing chamber 12 of the same cross-section. The expulsion piston 11 represented here in its upper, retracted position is caused to reciprocate by a working piston 13 connected rigidly with it, between the position represented in FIG. 2 and an extended position, in which the front end or face of the expulsion piston 11 is flush with the outlet of the cylindrical mixing chamber 12. The actuation of the working piston 13, arranged in a pressure cylinder 14, is brought about by means of a pneumatic or hydraulic pressure medium to one or the other face of the piston. Of the connections required for supply only the one connection (15) is shown specifically.

At a small distance from the retracted position of the expulsion piston 11 two mutually opposite inlet openings 16, 16' are arranged in the wall of the mixing chamber, which serve for the supply of the two plastics components into the mixing chamber 12 during the injection operation. The two openings 16, 16' are arranged at the same level, that is to say on the same radius, so that they are simultaneously opened or uncovered by the expulsion piston 11, something which is required for avoiding undesired lead of one component relative to the other in entering the mixing chamber.

The two inlet openings 16, 16' are directly adjacent to the associated inlet valves 5, 5', whose valve cones 17 and 17' cooperate with valve seats 18, 18' with a suitable mating shape. In order to ensure automatic, pressure-dependent opening and closing of the inlet valves 5 and 5', compression springs 19, 19' are provided so that separate means are not required for actuating the inlet valves. For setting the force or hardness of the compression springs 19, 19' adjustment bushings 20, 20' are provided, so that the level of opening pressure of the inlet valves 5 and 5' can be adjusted in a very simple manner. This opening pressure must naturally be selected to be higher than the recycling pressure.

The inlet valves 5 and 5' are arranged for reciprocating movement in valve chambers 21 and 21'. Since the valve shanks, forming the centre part of the inlet valves 5 and 5', have a substantially smaller diameter than the associated valve chambers, an annular space with a relatively large cross-section is provided, through which flow occurs on recycling without any undesired increase in pressure being brought about. On recycling the plastics component passes via the feed tube 3 or 3' into the valve chamber 21 or 21' respectively and leaves the latter via the return line 6 or 6' respectively which is not shown, the two inlet valves 5 and 5' being located in the open position shown in FIG. 2.

Owing to the two inlet valves arranged with their axes perpendicularly to the mixing chamber and to the expulsion piston it is therefore possible to avoid action of the plastics components on the expulsion piston and on the mixing chamber during the recycle phase which often lasts a relatively long time, so that no sealing and sticking problems arise. Furthermore recycling can be carried out using a relatively low pressure of approximately 30 atmospheres gauge, since at all positions in the flow circuit sufficiently large flow cross-sections are available, for recycling does not have to be via the mixing chamber inlet openings. In this respect it is also highly advantageous that in any case only a very minor fraction of the total quantity is recycled through the mixing head in accordance with the invention, since the major part of the quantity of plastics recycles through the bypass 10.

On switching over from recycling to injection firstly the cock valve 7 is closed — for example by means of a handle which is not shown — so that the whole quantity of plastics components, which is supplied by the feed pump 2, is pumped via the feed line 3 and a part of the return line 6 into the valve chamber of the inlet valve 5. The same also applies as regards the other plastics component and respectively as regards the oppositely placed inlet valve 5'. Since initially the plastics components cannot escape, high injection pressure of more than 100 atmospheres gauge is very rapidly built up throughout the system, and the precise setting of the high pressure for injection desired is carried out by the pressure limiting valve 9 or 9' respectively. On reaching the desired injection pressure or shortly before the two inlet valves 5 and 5' open and after they open, the expulsion piston 11, previously located in the extended position, is moved into the retracted position shown in FIG. 2. In order to achieve the greatest possible precision in metering it is expedient to cause metering to be carried out exclusively by the expulsion piston 11, for which reason the two inlet valves 5 and 5' are opened shortly before the expulsion piston 11 uncovers the inlet openings 16, 16'.

The injection or shot time is controlled, as will be described in more detail below, directly by the setting of the expulsion piston 11 so that a particularly high degree of precision of metering is achieved. Termination of the injection operation is in this respect brought about by moving the expulsion piston 11 out of the retracted position into the extended (inject) position, where the front end of the expulsion piston 11 is flush with the free end of the mixing chamber 12, so that any mixture residue will be completely expelled out of the mixing chamber 12, something which is also very advantageous for the aspect of precise metering. During termination, or directly after it, of this expulsion operation the cock valve 7 is opened so that switching over to recycling occurs. The change over from the injection operation to recycling leads to an immediate drop from the high injection pressure of more than 100 atmospheres gauge to the low recycling pressure of approximately 30 atmospheres gauge. Simultaneously with this the two inlet valves 5 and 5' automatically close owing to the pressure drop.

Particularly accurate metering of the injected plastics components can be achieved in the following manner.

The end, opposite to the outlet of the expulsion piston 11, of the pressure cylinder 14 has a spring loaded plunger 30, which is arranged in the end of the pressure cylinder for reciprocating movement in the longitudinal direction of the pressure cylinder 14 and cooperates with a limit switch 31 arranged outside the pressure cylinder 14. As will be seen from FIG. 2 of the drawing the spring loaded plunger 30 cooperates in such a manner with one end surface of the working piston 13 that at a certain position of the working piston 13 and of the expulsion piston 11 the plunger 30 and the limit switch 31 are actuated. The position, at which actuation of the limit switch 31 occurs, is selected in such a manner that this actuation occurs when the end of the expulsion piston 11 passes or uncovers the inlet opening 16. This point in time of actuation (point in time of passing over or uncovering of the inlet openings 16, 16' by the lower end of the expulsion piston 11) is set as the beginning of the so-called shot time (beginning of the injection operation). In other words the shot time is directly controlled or determined by the expulsion piston 11 or rathermore by sensing of the position of the expulsion piston 11. As a result it is possible to achieve a substantially more precise metering of the quantities injected than was previously possible with known mixing heads, for in the case of known mixing heads the course of the shot time and the movement of the expulsion piston occur independently of each other or these two operations are initially started simultaneously by a pulse. The consequence of this is however the substantial disadvantage that, in cases in which the expulsion piston must firstly be "got moving" at the beginning of its travel, inaccuracy occurs in the metering, for in such cases the actual shot time is smaller than the calculated shot time. The shot time is thus shortened by a time due to the expulsion piston being "too slow" at the beginning of its movement. Such cases occur relatively often in practice if the time lag between two different shots is relatively large.

In the case of the mixing head in accordance with the invention the above mentioned difficulties are very simply avoided by arranging for the shot time or the duration of the shot to be directly started or controlled by the expulsion piston, so that it is possible to ensure that at the beginning of the shot time the injection procedure immediately begins without any lag of whatever type occurring, which would otherwise lead to too little material being metered out.

At the end of the shot time, whose duration can be set by any suitable device, not specifically shown, the working piston 13, and accordingly simultaneously the expulsion piston 11 are moved out of the retracted position shown in FIG. 2 toward the extended (full expulsion) position. The point in time of passing the inlet openings 16, 16' by the one end of the expulsion piston 11 is in this respect set as the end of the shot time so that the selected shot time is exactly in accord with the actual shot time, that is to say with the actual duration of the injection operation.

Instead of compressed air or instead of conventional hydraulic oil it is possible to use dioctyl phthalate as a pressure medium for actuating the working piston, so that undesired reaction between the pressure medium (for actuation of the working piston 13) and the plastics components can be avoided since dioctyl phthalate does not react chemically with conventionally used plastics components, whereas a reaction does occur with hydraulic oil. Such an undesired chemical reaction can accordingly be avoided with the invention even if a thin film of pressure medium should be transported by the expulsion piston 11 out of the one working chamber of the pressure cylinder 14 into the mixing chamber 12 despite the intermediate seals 32.

The mixing head is used principally for the production of polyurethane foam material, that is to say more particularly cushions, automobile seats and the like. In the case of the production of such a polyurethane foam material the two plastics components consist of toluene diisocyanate and a polyol.

I claim:

1. A high pressure mixing head for mixing at least two different plastic material components, comprising a casing having an axially elongated cylindrical mixing chamber having an open outlet at one end, separate inlet valve chambers and feed channels in respective flow-communication therewith in said head for each of said plastic material components and separate inlet ports respectively connecting said valve chambers to said mixing chamber at a point intermediate the axial extent thereof in said casing, an inlet valve located in each of said valve chambers and movable into and out of closing position in the respective inlet ports at the upstream side thereof, separate return flow channels in said casing respectively communicating with said chambers, an expulsion piston whose surface is free of return grooves and makes a lapped fit in said mixing chamber, said piston being movable axially towards a retracted position in said mixing chamber during which said inlet ports are simultaneously uncovered and, alternatively, toward an extended position during which said inlet ports are simultaneously covered by said piston and the face of said piston becomes substantially flush with said mixing chamber outlet, and means for reciprocating said piston.

2. A mixing head as defined in claim 1, wherein said inlet valves are biased toward closed position in the respective inlet ports in said chambers.

3. A mixing head as defined in claim 2, which further includes adjustment means for setting the biasing force on said inlet valves.

4. A mixing head as defined in claim 1, wherein said means for reciprocating said expulsion piston comprises a power piston and cylinder disposed in end-to-end alignment with said expulsion piston and mixing chamber in said mixing head casing, a common wall separating said power cylinder and mixing chamber, and said expulsion piston extending through said common wall into said power cylinder, means for selectively applying fluid under pressure to opposite sides of said power piston to cause movement thereof, the fluid under pressure in said power cylinder being dioctylphthalate.

5. In a system for mixing and molding a plurality of chemically reactive polymeric material components, which includes a high pressure mixing head;
a component circulating system for each of said polymeric components including a supply container, pump, feed line and return line, each said system being connected in series flow with said mixing head;
a bypass line connecting the feed and return lines of the respective component circulating systems, and shunting their connection to said mixing head, and
a shut-off valve in each of said circulating system return lines located downstream of the respective bypass connection thereto;

the improvement which comprises:

said mixing head having a casing and an axially elongated cylindrical mixing chamber defined thereby having an open outlet at one end;
separate inlet valve chambers and feed channels in said casing establishing flow communication with respective component feed lines of said component circulating systems;
separate inlet ports respectively connecting all of said valve chambers to said mixing chamber;
an inlet valve located in each of said valve chambers, being movable into and out of closing position in the respective inlet ports at the upstream side thereof, means biasing said inlet valves to closed position and piston means on said inlet valves exposed to component pressure in said chambers to oppose said biasing means and open said inlet valves under predetermined component pressure;
separate flow channels in said casing establishing communication between respective valve chambers and component return lines of the respective circulating systems;
an expulsion piston whose surface is free of return grooves and makes a lapped fit in said mixing chamber, said piston being movable axially towards a retracted position in said casing, during which said inlet ports are simultaneously uncovered, and alternatively toward an extended position, during which said inlet ports are simultaneously covered by said piston and the face of said piston becomes substantially flush with said mixing chamber outlet; and
means for reciprocating said piston in timed relation to the joint operation of all of said component shut-off valves whereby said shut-off valves are (1) closed prior to arrival of said expulsion piston at its port-uncovering position in said mixing chamber, the closing of said shut-off valve causing said components to develop a high pressure in said respective valve chambers to open said inlet valves, and (2) said shut-off valves are opened after said expulsion piston has moved back to its port-covering position.

* * * * *